(12) United States Patent
Kowalski et al.

(10) Patent No.: US 7,047,806 B2
(45) Date of Patent: May 23, 2006

(54) LIQUID LEVEL GAGE AND ILLUMINATOR THEREFOR

(75) Inventors: Kenneth H. Kowalski, Strongsville, OH (US); Frank A. Severa, Elyria, OH (US)

(73) Assignee: Clark-Reliance Corporation, Strongsville, OH (US)

( * ) Notice: Subject to any disclaimer, the term of this patent is extended or adjusted under 35 U.S.C. 154(b) by 217 days.

(21) Appl. No.: 10/661,828

(22) Filed: Sep. 12, 2003

(65) Prior Publication Data
US 2005/0056091 A1 Mar. 17, 2005

(51) Int. Cl.
*G01F 23/28* (2006.01)

(52) U.S. Cl. ............................. 73/293; 73/297; 73/328
(58) Field of Classification Search .................. 73/293, 73/297, 328
See application file for complete search history.

(56) References Cited

U.S. PATENT DOCUMENTS

| 3,128,626 | A | | 4/1964 | Faber |
| 3,187,573 | A | * | 6/1965 | Goellner ........................ 73/329 |
| 4,450,722 | A | * | 5/1984 | Keyes et al. ..................... 73/293 |
| 4,633,711 | A | * | 1/1987 | Hipple et al. ................... 73/293 |
| 5,660,461 | A | | 8/1997 | Ignatius et al. |
| 6,033,087 | A | | 3/2000 | Shozo et al. |

FOREIGN PATENT DOCUMENTS

| CA | 2410978 A1 | 5/2004 |
| CA | 2465601 A1 | 5/2004 |
| DE | 198 00 770 A1 | 12/1998 |
| FR | 1374848 A | 10/1964 |
| GB | 392882 A | 5/1933 |
| GB | 836172 A | 6/1960 |
| JP | 2003 172651 A | 6/2003 |
| WO | WO 2004/042332 A1 | 5/2004 |

\* cited by examiner

*Primary Examiner*—Hezron Williams
*Assistant Examiner*—Katina Wilson
(74) *Attorney, Agent, or Firm*—Calfee, Halter & Griswold LLP

(57) ABSTRACT

The present invention provides a liquid level gage and an illuminator therefor. One embodiment of the liquid level gage includes a housing, a liquid column, an illuminator, and a power supply. The housing has a first or front end and a second or rear end. The liquid column includes a plurality of liquid column bodies connected to the front end of the housing. The liquid column also includes a first or front port assembly and a second or rear port assembly connected to each liquid column body. The liquid column is connected, either directly or indirectly, to a vessel. The illuminator includes a plurality of directed light source assemblies connected to the rear end of the housing. Half of the directed light source assemblies emit a first color light and half of the directed light source assemblies emit a second color light. A pair of bi-color directed light source assemblies (i.e., one directed light source assembly emitting the first color light and one directed light source assembly emitting the second color light) correspond to each liquid column body and pair of port assemblies (i.e., the front port assembly and the rear port assembly connected to the liquid column body). Each pair of bi-color directed light source assemblies is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

21 Claims, 4 Drawing Sheets

LIQUID LEVEL GAGE AND ILLUMINATOR THEREFOR

FIELD OF THE INVENTION

The present invention relates generally to a liquid level gage and, more particularly, to an illuminator for a liquid level gage.

BACKGROUND OF THE INVENTION

Liquid level gages are used to determine the level of liquid in vessels (such as boilers, tanks, and drums). Viewing may occur directly or remotely (for example, using a camera). A prior art liquid level gage is described and shown in U.S. Pat. No. 3,187,573 (the "Goellner Patent"), which is incorporated herein by reference. This liquid level gage is commercially available under the SIMPLIPORT water level gage product line from Clark-Reliance Corporation. In operation, a user views the ports of the liquid level gage to determine the level of liquid in the vessel. Ports below the level of liquid in the vessel are displayed as green, and ports above the level of liquid in the vessel are displayed as red.

Prior liquid level gages are typically illuminated by flood lights and color filters. Liquid level gages that are illuminated by flood lights are undesirable because flood lights require a high voltage power supply, radiate large amount of heats, do not provide precise illumination, and require a great deal of maintenance. Therefore, a need exists for a liquid level gage that overcomes the deficiencies in the existing liquid level gages.

SUMMARY OF THE INVENTION

The present invention provides a liquid level gage and an illuminator therefor. One embodiment of a liquid level gage of the present invention includes a housing, a liquid column, an illuminator, and a power supply. The housing has a first or front end and a second or rear end. The liquid column includes a plurality of liquid column bodies connected to the front end of the housing. The liquid column also includes a first or front port assembly and a second or rear port assembly connected to each liquid column body. The liquid column is connected, either directly or indirectly, to a vessel.

The illuminator includes a plurality of directed light source assemblies connected to the rear end of the housing. Half of the directed light source assemblies emit a first color light and half of the directed light source assemblies emit a second color light. A pair of bi-color directed light source assemblies (i.e., one directed light source assembly emitting the first color light and one directed light source assembly emitting the second color light) correspond to each liquid column body and pair of port assemblies (i.e., the front port assembly and the rear port assembly connected to the liquid column body). Each pair of bi-color directed light source assemblies is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

In one embodiment of the present invention, the liquid whose level is to be determined is water, the liquid column is a water column, and each liquid column body is a water column body. Additionally, each directed light source assembly emitting the first color light is a green directed light source assembly and each directed light source assembly emitting the second color light is a red directed light source assembly. More specifically, each green directed light source assembly is a green light emitting diode (LED) assembly and each red directed light source assembly is a red light emitting diode (LED) assembly.

One embodiment of the green and red LED assemblies includes a base, a green or red LED, a reflecting cup, a focusing lens, and a lens holder. The base is a printed circuit board (PCB) or a portion thereof. Each green or red LED is electrically connected to the base. The LEDs emit directed green and red light toward the liquid column and, more specifically, toward the rear port assemblies. The reflecting cups further direct the green and red light toward the rear port assemblies. The reflecting cups are press-fit over the LEDs. The focusing lenses focus the green and red light toward the rear port assemblies. The focusing lenses are held in place by means of the lens holders. The lens holders are connected to the base.

In operation, liquid from the vessel enters the liquid column bodies to a level that corresponds to the level of liquid in the vessel. The plurality of green and red LEDs emit directed green and red light toward the rear port assemblies. If used, the reflecting cups and the focusing lenses further direct and focus the green and red light toward the rear port assemblies. The directed green and red light that is emitted from each pair of green and red LEDs passes through the housing and the corresponding rear port assembly into the corresponding liquid column body. If a liquid is present in the corresponding liquid column body, the green light passes through the liquid column body into the corresponding front port assembly where it can be observed by a user, but the red light does not. If a non-liquid is present in the corresponding liquid column body, the red light passes through the liquid column body into the corresponding front port assembly where it can be observed by the user, but the green light does not. The level of liquid in the liquid column bodies is shown by the front port assemblies displaying green light. Since the level of liquid in the liquid column bodies corresponds to the level of liquid in the vessel, the user can determine the level of liquid in the vessel by observing the level of liquid in the liquid column bodies.

DETAILED DESCRIPTION OF THE INVENTION

Figure 1:
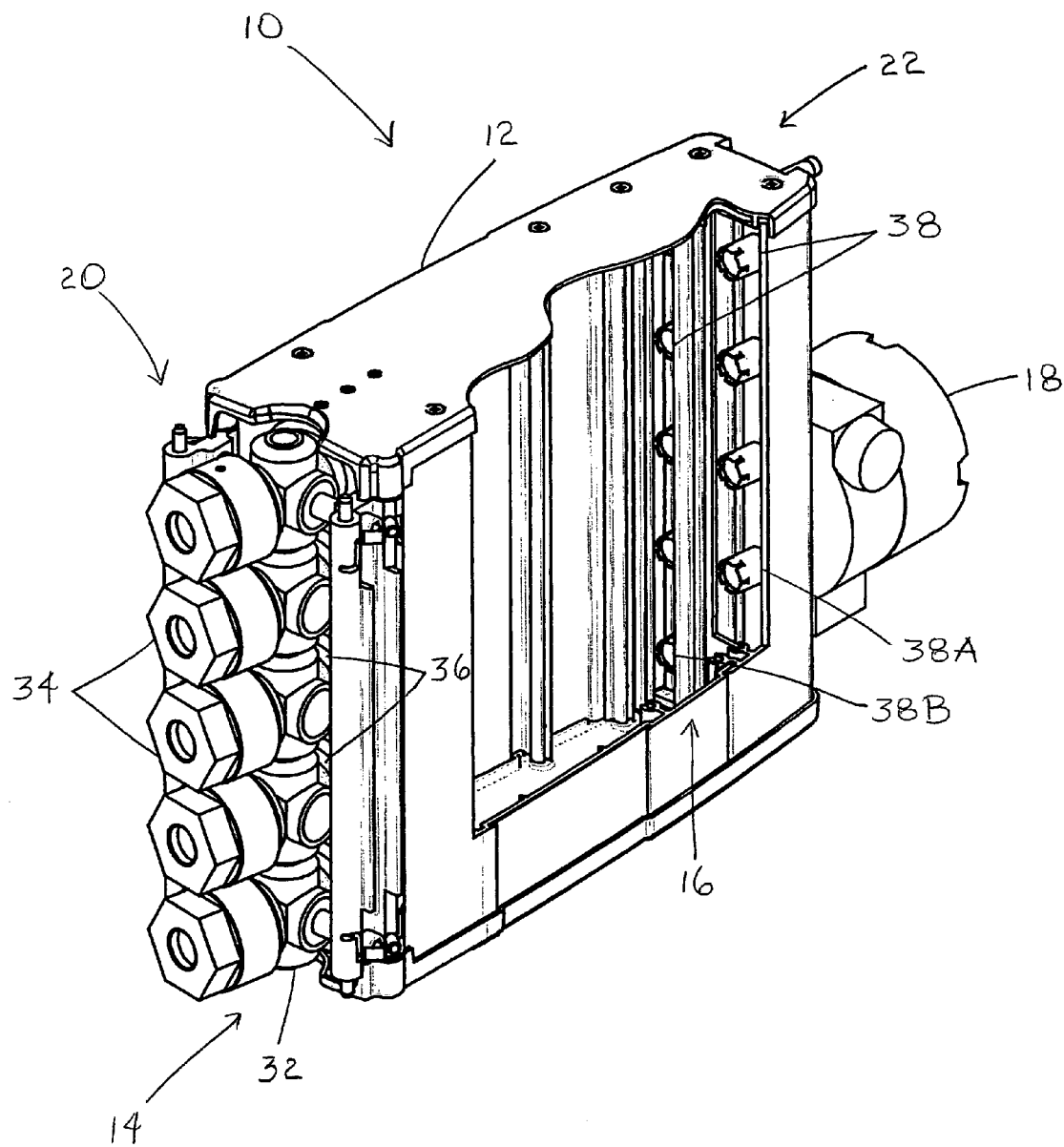
FIG. 1 is a perspective view of a liquid level gage of the present invention with a portion of a housing cut away.
Figure 2:
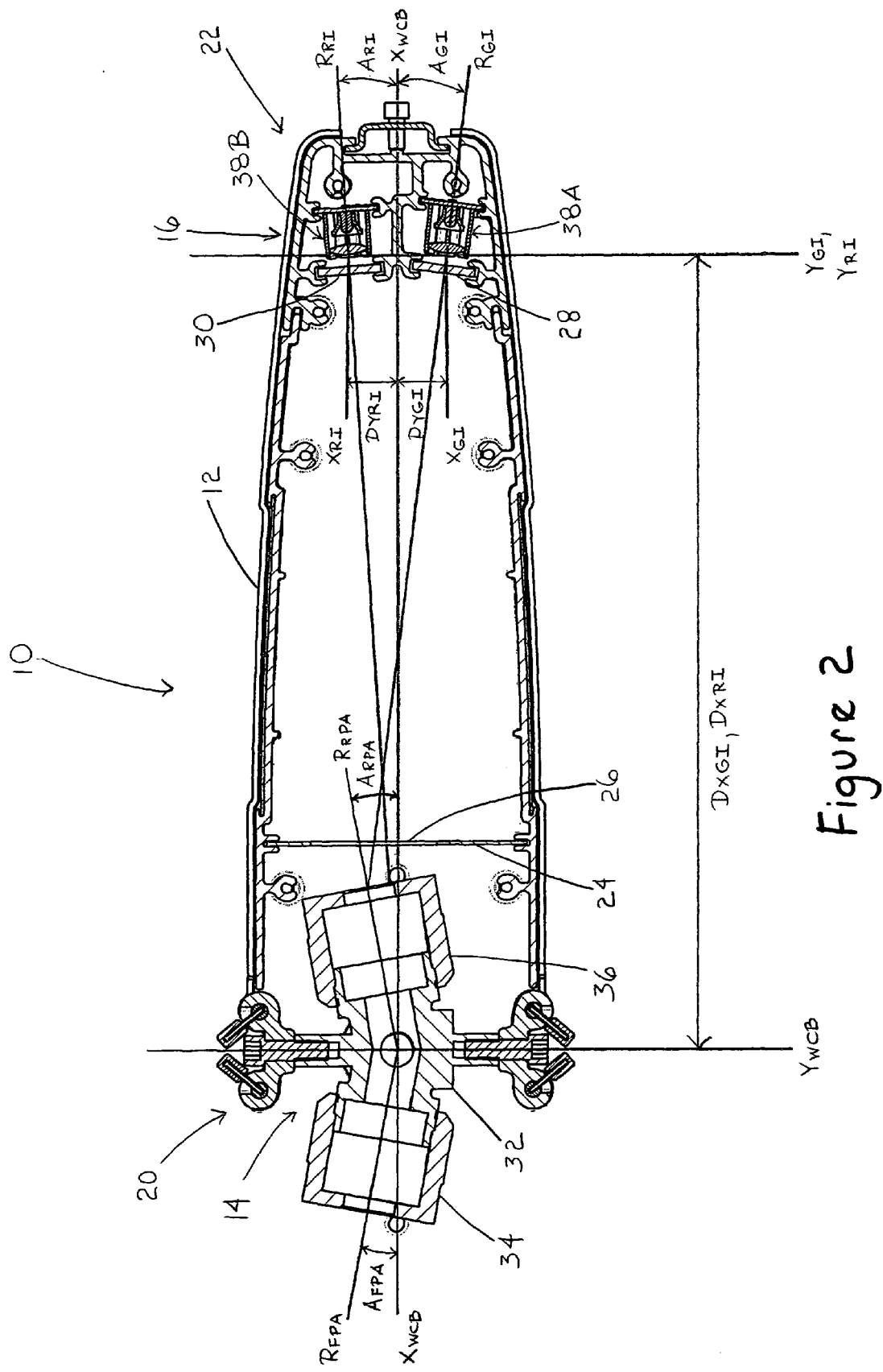
FIG. 2 is a top cross-sectional view of the liquid level gage of FIG. 1.

The present invention provides a liquid level gage and an illuminator therefor. One embodiment of a liquid level gage 10 of the present invention is shown in FIGS. 1 and 2. The liquid level gage 10 includes a housing 12, a liquid column 14, an illuminator 16, and a power supply 18. The structure of each of these components will now be described.

The housing 12 has a first or front end 20 and a second or rear end 22. The housing 12 includes a heat shield 24 for protecting the illuminator 16 from any heat given off by the liquid column 14. The heat shield 24 includes openings 26 for allowing light emitted from the illuminator 16 to pass through to the liquid column 14. The housing 12 also includes a first illuminator shield 28 and a second illuminator shield 30 for protecting the illuminator 16 from the environment. In one embodiment of the present invention, the housing 12 is made of aluminum, the heat shield 24 is made of stainless steel, and the first and second illuminator shields 28 and 30 are made of transparent glass. Additionally, in one embodiment of the present invention, the housing 12 is generally rectangular shaped and the openings 26 in the heat shield 24 are generally circular shaped. However, one of ordinary skill in the art will appreciate that these components could be made of other materials and could have other shapes.

The liquid column 14 includes a plurality of liquid column bodies 32 connected to the front end 20 of the housing 12. The liquid column 14 also includes a first or front port assembly 34 and a second or rear port assembly 36 connected to each liquid column body 32. In one embodiment of the present invention, there are five (5) liquid column bodies 32 and corresponding pairs of front and rear port assemblies 34 and 36. However, one of ordinary skill in the art will appreciate that any number of liquid column bodies 32 and corresponding pairs of front and rear port assemblies 34 and 36 could be used depending on the range desired. The structure and function of one embodiment of the liquid column 14, including the liquid column bodies 32 and the front and rear port assemblies 34 and 36, is described in the Goellner Patent and will not be described herein. One of ordinary skill in the art will appreciate that other liquid columns having similar structure and function to the liquid column described in the Goellner Patent could also be used in the present invention. The liquid column 14 is connected, either directly or indirectly, to a vessel (not shown).

The illuminator 16 includes a plurality of directed light source assemblies 38 connected to the rear end 22 of the housing 12. As used herein, a directed light source is a light source whose emitted light can be relatively precisely directed at a target (in this case, the liquid column 14 and, more specifically, the rear port assembly 36). Half of the directed light source assemblies 38 emit a first color light and half of the directed light source assemblies 38 emit a second color light. A pair of bi-color directed light source assemblies 38 (i.e., one directed light source assembly 38 emitting the first color light and one directed light source assembly 38 emitting the second color light) correspond to each liquid column body 32 and pair of port assemblies 34 and 36 (i.e., the front port assembly 34 and the rear port assembly 36 connected to the liquid column body 32). Each pair of bi-color directed light source assemblies 38 is oriented with respect to the corresponding liquid column body 32 and pair of port assemblies 34 and 36 in such a way that the first color light passes through the corresponding liquid column body 32 and pair of port assemblies 34 and 36 when a liquid is present in the corresponding liquid column body 32 and the second color light passes through the corresponding liquid column body 32 and pair of port assemblies 34 and 36 when a non-liquid is present in the corresponding liquid column body 32.

The power supply 18 is electrically connected to the illuminator 16 and, more specifically, to the directed light source assemblies 38. The power supply is a low voltage direct current (DC) power supply. In one embodiment of the present invention, the power supply is a twenty-four volt direct current (24VDC) power supply. Power supplies are well known in the art and will not be described in detail.

In one embodiment of the present invention, the liquid whose level is to be determined is water, the liquid column 14 is a water column, and each liquid column body 32 is a water column body. Additionally, each directed light source assembly 38 emitting the first color light is a green directed light source assembly and each directed light source assembly 38 emitting the second color light is a red directed light source assembly. More specifically, each green directed light source assembly 38 is a green light emitting diode (LED) assembly 38A and each red directed light source assembly 38 is a red light emitting diode (LED) assembly 38B. However, one of ordinary skill in the art will appreciate that the bi-color directed light source assemblies 38 could emit other first and second color light and could include other directed light sources (as defined above), such as lasers.

Figure 3:
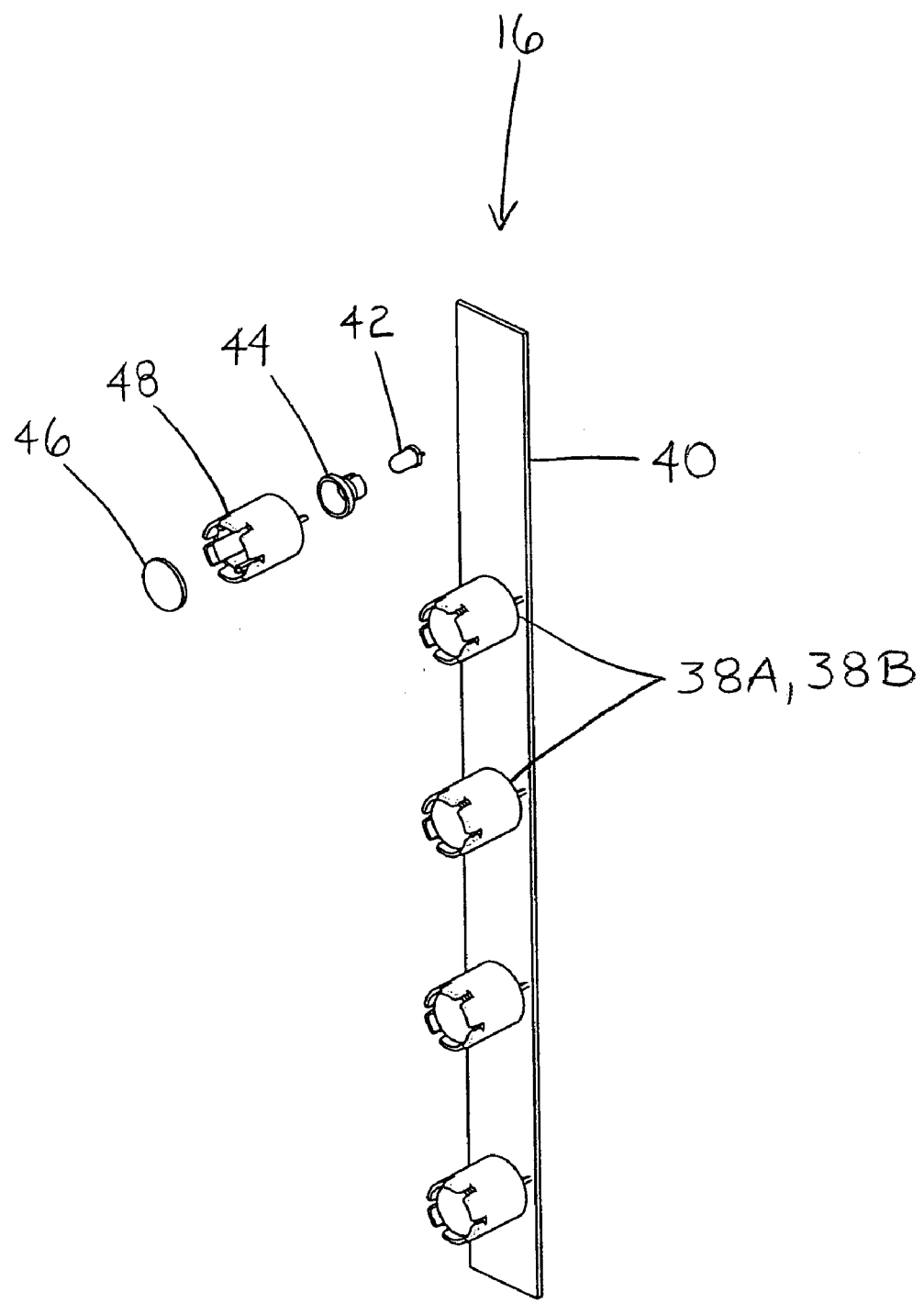
FIG. 3 is a perspective view of a portion of an illuminator of the liquid level gage of FIG. 1 with an exploded view of an LED assembly.
Figure 4:
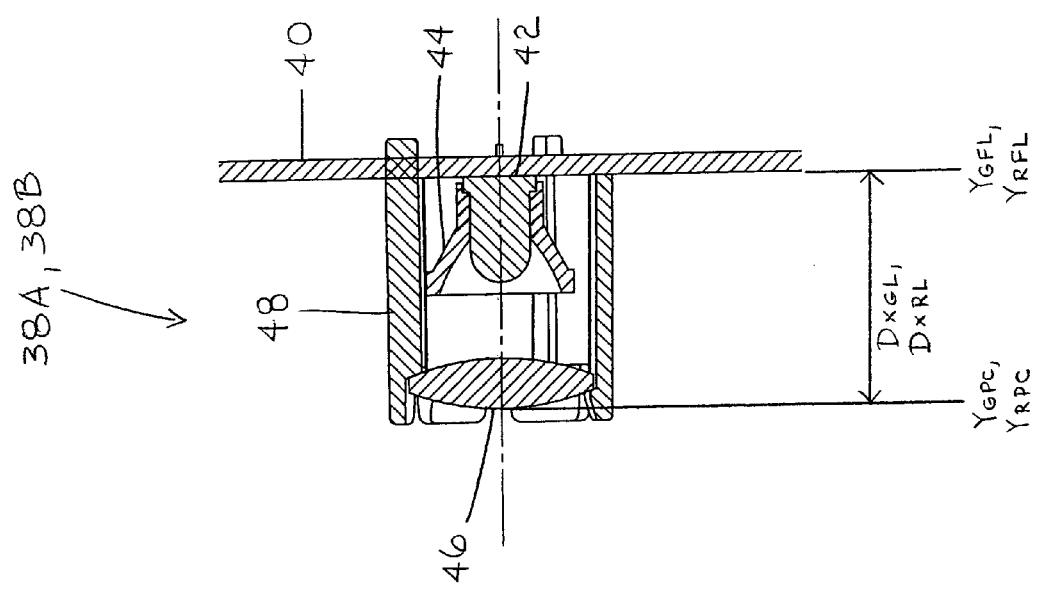
FIG. 4 is a top cross-sectional view of an LED assembly of the illuminator of FIG. 3.

One embodiment of the green and red LED assemblies 38A and 38B is shown in FIGS. 3 and 4. Each green or red LED assembly 38A or 38B includes a base 40, a green or red LED 42, a reflecting cup 44, a focusing lens 46, and a lens holder 48. The base 40 is a printed circuit board (PCB) or a portion thereof. PCBs are well-known in the art and will not be described in greater detail. Each green or red LED 42 is electrically connected to the base 40 by any suitable means, such as soldering. The LEDs 42 emit directed green and red light toward the liquid column 14 and, more specifically, toward the rear port assemblies 36.

The reflecting cups 44 further direct the green and red light toward the rear port assemblies 36. The reflecting cups 44 are pressed down over the LEDs 42 until the reflecting cups 44 are substantially surrounding the LEDs 42. The reflecting cups 44 are held in place by means of a tight fit between the LEDs 42 and the reflecting cups 44. The focusing lenses 46 focus the green and red light toward the rear port assemblies 36. The focusing lenses 46 are bi-convex lenses. The focusing lenses 46 are held in place by means of the lens holders 48. The lens holders 48 are connected to the base 40. In one embodiment of the present invention, each green or red LED 42 has a corresponding reflecting cup 44, focusing lens 46, and lens holder 48. However, one of ordinary skill in the art will appreciate that the liquid level gage 10 could be used without the reflecting cups 44, focusing lenses 46, and lens holders 48 without affecting the overall functioning of the liquid level gage 10.

In one embodiment of the present invention, the components of the liquid level gage 10 are oriented with respect to one another as set forth below:

1. The distance $D_{XGI}$ from a line $Y_{GI}$ passing through the front-most surface of the focusing lens 46 in each green LED assembly 38A to a line $Y_{WCB}$ passing through the center of the corresponding liquid column body 32 is approximately 12.550 inches.

2. The distance $D_{XRI}$ from a line $Y_{RI}$ passing through the front-most surface of the focusing lens 46 in each red LED assembly 38B to the line $Y_{WCB}$ passing through the center of the corresponding liquid column body 32 is approximately 12.550 inches.

3. The distance $D_{YGI}$ from a line $X_{GI}$ passing through the center of the focusing lens 46 in each green LED assembly 38A to a line $X_{WCB}$ passing through the center of the corresponding liquid column body 32 in a direction that is perpendicular to $Y_{WCB}$ is approximately 0.788 inches.

4. The distance $D_{YRI}$ from a line $X_{RI}$ passing through the center of the focusing lens 46 in each red LED assembly 38B to the line $X_{WCB}$ passing through the center of the corresponding liquid column body 32 in a direction that is perpendicular to $Y_{WCB}$ is approximately 0.761 inches.

5. The angle $A_{GI}$ between a line $R_{GI}$ passing through the center of the LED 42 in each green LED assembly 38A and the line $X_{WCB}$ passing through the center of the corresponding liquid column body 32 is approximately 7.1 degrees. However, the angle $A_{GI}$ can be in the range of 0–10 degrees and even in the range of 0–25 degrees, although the liquid level gage 10 may not be as precise in the broader ranges of angles.

6. The angle $A_{RI}$ between a line $R_{RI}$ passing through the center of the LED 42 in each red LED assembly 38B and the line $X_{WCB}$ passing through the center of the corresponding liquid column body 32 is approximately 3.6 degrees. However, the angle $A_{RI}$ can be in the range of 0–10 degrees and even in the range of 0–25 degrees, although the liquid level gage 10 may not be as precise in the broader ranges of angles.

7. The distance $D_{XGL}$ from a line $Y_{GPC}$ passing through the front surface of the PCB 40 in each green LED assembly 38A to a line $Y_{GFL}$ passing through the front surface of the focusing lens 46 in each green LED assembly 38A is approximately 0.754 inches.

8. The distance $D_{XRL}$ from a line $Y_{RPC}$ passing through the front surface of the PCB 40 in each red LED assembly 38B to a line $Y_{RFL}$ passing through the front surface of the focusing lens 46 in each red LED assembly 38B is approximately 0.692 inches.

9. The angle $A_{FPA}$ between a line $R_{FPA}$ passing through the center of each front port assembly 34 and the line $X_{WCB}$ passing through the center of the corresponding liquid column body 32 is approximately 10 degrees.

10. The angle $A_{RPA}$ between a line $R_{RPA}$ passing through the center of each rear port assembly 36 and the line $X_{WCB}$ passing through the center of the corresponding liquid column body 32 is approximately 10 degrees.

The orientation of the components of the liquid level gage 10 as set forth above is based on principles of light refraction. Light refracts through a liquid (e.g., water) differently than it refracts through a non-liquid (e.g., steam or air). When the components of the liquid level gage 10 are oriented as set forth above, green light passes through the liquid column body 32 when a liquid is present in the liquid column body 32 and red light passes through the liquid column body 32 when a non-liquid is present in the liquid column body 32.

In operation, liquid from the vessel enters the liquid column bodies 32 to a level that corresponds to the level of liquid in the vessel. The plurality of green and red LEDs 42 emit directed green and red light toward the rear port assemblies 36. If used, the reflecting cups 44 and the focusing lenses 46 further direct and focus the green and red light toward the rear port assemblies 36. The directed green and red light that is emitted from each pair of green and red LEDs 42 passes through the housing 12 (including the first and second illuminator shields 28 and 30 and the openings 26 in the heat shield 24) and the corresponding rear port assembly 36 into the corresponding liquid column body 32. If a liquid is present in the corresponding liquid column body 32, the green light passes through the liquid column body 32 into the corresponding front port assembly 34 where it can be observed by a user, but the red light does not. If a non-liquid is present in the corresponding liquid column body 32, the red light passes through the liquid column body 32 into the corresponding front port assembly 34 where it can be observed by the user, but the green light does not. The level of liquid in the liquid column bodies 32 is shown by the front port assemblies 34 displaying green light. Since the level of liquid in the liquid column bodies 32 corresponds to the level of liquid in the vessel, the user can determine the level of liquid in the vessel by observing the level of liquid in the liquid column bodies 32.

One of ordinary skill in the art will now appreciate that the present invention provides a liquid level gage and an illuminator therefor. Although the present invention has been shown and described with reference to a particular embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A liquid level gage, comprising:
a housing having a first end and a second end;
a liquid column connected to the first end of the housing, the liquid column including a plurality of liquid column bodies and a plurality of port assemblies, wherein a pair of port assemblies is connected to each liquid column body; and
an illuminator connected to the second end of the housing, the illuminator including a plurality of directed light source assemblies, wherein:
half of the directed light source assemblies emit a first color light and half of the directed light sources emit a second color light,
a pair of bi-color directed light source assemblies corresponds to each liquid column body and pair of port assemblies, and
each pair of bi-color directed light source assemblies is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

2. The liquid level gage of claim 1, wherein each directed light source assembly emitting the first color light is a green directed light source assembly and each directed light source assembly emitting the second color light is a red directed light source assembly.

3. The liquid level gage of claim 2, wherein:
an angle between a line passing through a center of the green directed light source assembly to a line passing through a center of the corresponding liquid column body is in the range of 0–25 degrees; and
an angle between a line passing through a center of the red directed light source assembly to the line passing through the center of the corresponding liquid column body is in the range of 0–25 degrees.

4. The liquid level gage of claim 3, wherein:
the angle between the line passing through the center of the green directed light source assembly to the line passing through the center of the corresponding liquid column body is in the range of 0–10 degrees; and
the angle between the line passing through the center of the red directed light source assembly to the line passing through the center of the corresponding liquid column body is in the range of 0–10 degrees.

5. The liquid level gage of claim 4, wherein:
the angle between the line passing through the center of the green directed light source assembly to the line passing through the center of the corresponding liquid column body is approximately 7.1 degrees; and
the angle between the line passing through the center of the red directed light source assembly to the line passing through the center of the corresponding liquid column body is approximately 3.6 degrees.

6. The liquid level gage of claim 3, wherein:
an angle between a line passing through a center of each port assembly and the line passing through the center of the corresponding liquid column body is approximately 10 degrees.

7. The liquid level gage of claim 2, wherein each green directed light source assembly includes a green light emitting diode and each red directed light source assembly includes a red light emitting diode.

8. The liquid level gage of claim 2, wherein each green directed light source assembly includes a reflecting cup and each red directed light source assembly includes a reflecting cup.

9. The liquid level gage of claim 2, wherein each green directed light source assembly includes a focusing lens and each red directed light source assembly includes a focusing lens.

10. The liquid level gage of claim 2, wherein the liquid is water.

11. A liquid level gage, comprising:
a housing having a front end and a rear end;
a liquid column connected to the front end of the housing, the liquid column including a plurality of liquid column bodies and a plurality of port assemblies, wherein:
  a pair of port assemblies is connected to each liquid column body, and
  an angle between a line passing through a center of each port assembly and a line passing through a center of the corresponding liquid column body is approximately 10 degrees; and
an illuminator connected to the rear end of the housing, the illuminator including a plurality of green light emitting diode assemblies and a plurality of red light emitting diode assemblies, wherein:
  a green light emitting diode assembly and a red light emitting diode assembly correspond to each liquid column body and pair of port assemblies,
  an angle between a line passing through a center of the green directed light source assembly to the line passing through the center of the corresponding liquid column body is approximately 7.1 degrees, and
  an angle between a line passing through a center of the red directed light source assembly to the line passing through the center of the corresponding liquid column body is approximately 3.6 degrees,
  whereby the green light passes through the corresponding liquid column body and pair of port assemblies when a liquid is present in the corresponding liquid column body and the red light passes through the corresponding liquid column body and pair of port assemblies when a non-liquid is present in the corresponding liquid column body.

12. An illuminator for a liquid level gage, the liquid level gage including a housing having a first end and a second end and a liquid column connected to the first end of the housing, the liquid column including a plurality of liquid column bodies and a plurality of port assemblies, wherein a pair of port assemblies is connected to each liquid column body, the illuminator comprising:
a plurality of directed light source assemblies connected to the second end of the housing, wherein:
  half of the directed light source assemblies emit a first color light and half of the directed light sources emit a second color light,
  a pair of bi-color directed light source assemblies corresponds to each liquid column body and pair of port assemblies, and
  each pair of bi-color directed light source assemblies is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

13. The liquid level gage of claim 12, wherein each directed light source assembly emitting the first color light is a green directed light source assembly and each directed light source assembly emitting the second color light is a red directed light source assembly.

14. The liquid level gage of claim 13, wherein:
an angle between a line passing through a center of the green directed light source assembly to a line passing through a center of the corresponding liquid column body is in the range of 0–25 degrees; and
an angle between a line passing through a center of the red directed light source assembly to the line passing through the center of the corresponding liquid column body is in the range of 0–25 degrees.

15. The liquid level gage of claim 14, wherein:
the angle between the line passing through the center of the green directed light source assembly to the line passing through the center of the corresponding liquid column body is in the range of 0–10 degrees; and
the angle between the line passing through the center of the red directed light source assembly to the line passing through the center of the corresponding liquid column body is in the range of 0–10 degrees.

16. The liquid level gage of claim 15, wherein:
the angle between the line passing through the center of the green directed light source assembly to the line passing through the center of the corresponding liquid column body is approximately 7.1 degrees; and
the angle between the line passing through the center of the red directed light source assembly to the line passing through the center of the corresponding liquid column body is approximately 3.6 degrees.

17. The liquid level gage of claim 13, wherein each green directed light source assembly includes a green light emitting diode and each red directed light source assembly includes a red light emitting diode.

18. The liquid level gage of claim 13, wherein each green directed light source assembly includes a reflecting cup and each red directed light source assembly includes a reflecting cup.

19. The liquid level gage of claim 13, wherein each green directed light source assembly includes a focusing lens and each red directed light source assembly includes a focusing lens.

20. The liquid level gage of claim 13, wherein the liquid is water.

21. An illuminator for a liquid level gage, the liquid level gage including a housing having a front end and a rear end and a liquid column connected to the front end of the housing, the liquid column including a plurality of liquid column bodies and a plurality of port assemblies, wherein a pair of port assemblies is connected to each liquid column body and an angle between a line passing through a center of each port assembly and a line passing through a center of the corresponding liquid column body is approximately 10 degrees, the illuminator comprising:
- a plurality of green light emitting diode assemblies and a plurality of red light emitting diode assemblies connected to the rear end of the housing, wherein:
- a green light emitting diode assembly and a red light emitting diode assembly correspond to each liquid column body and pair of port assemblies,
  - an angle between a line passing through a center of the green directed light source assembly to the line passing through the center of the corresponding liquid column body is approximately 7.1 degrees, and
- an angle between a line passing through a center of the red directed light source assembly to the line passing through the center of the corresponding liquid column body is approximately 3.6 degrees,
- whereby the green light passes through the corresponding liquid column body and pair of port assemblies when a liquid is present in the corresponding liquid column body and the red light passes through the corresponding liquid column body and pair of port assemblies when a non-liquid is present in the corresponding liquid column body.

* * * * *

(12) EX PARTE REEXAMINATION CERTIFICATE (8045th)
United States Patent
Kowalski et al.

(10) Number: US 7,047,806 C1
(45) Certificate Issued: Feb. 22, 2011

(54) LIQUID LEVEL GAGE AND ILLUMINATOR THEREFOR

(75) Inventors: Kenneth H. Kowalski, Strongsville, OH (US); Frank A. Severa, Elyria, OH (US)

(73) Assignee: Clark-Reliance Corporation, Strongsville, OH (US)

Reexamination Request:
No. 90/010,331, Nov. 6, 2008

Reexamination Certificate for:
Patent No.: 7,047,806
Issued: May 23, 2006
Appl. No.: 10/661,828
Filed: Sep. 12, 2003

(51) Int. Cl.
*G01F 23/28* (2006.01)

(52) U.S. Cl. .............................. 73/293; 73/297; 73/328
(58) Field of Classification Search .................. None
See application file for complete search history.

(56) References Cited

U.S. PATENT DOCUMENTS

| | | | |
|---|---|---|---|
| 3,187,573 A | 6/1965 | Goellner |
| 3,370,469 A | 2/1968 | Mackenzie |
| 3,992,941 A | 11/1976 | McGoldrick |
| 4,533,306 A | 8/1985 | Frederick |
| 4,695,796 A | 9/1987 | Omet et al. |
| 4,748,299 A | 5/1988 | Custer |
| 5,072,616 A | 12/1991 | Sherrick |
| 5,103,673 A | 4/1992 | Sawada et al. |

(Continued)

FOREIGN PATENT DOCUMENTS

| | | |
|---|---|---|
| DE | 2720761 A1 | 11/1978 |
| DE | 4323735 A1 | 1/1995 |
| DE | 10006221 A1 | 8/2001 |
| FR | 1 374 848 | 10/1964 |
| GB | 836172 | 6/1960 |
| GB | 2234122 A | 1/1991 |
| JP | 1-290305 A | 11/1989 |
| JP | 3-38656 Y2 | 8/1991 |
| JP | 003-172651 | 6/2003 |

OTHER PUBLICATIONS

The Society of Instrument and Control Engineers, Level Measuring, The First Edition Published on Nov. 30, 1986, Chapter 3, Level Gauge (cited in Official Action listed in Cite No. 1 above) (4 pages and 4 pages of translation).

Technor EEx em Backlights for Level Gauges, publicly available at least as early as Jul. 16, 2002 (4 pages).

*Primary Examiner*—Anjan K. Deb

(57) ABSTRACT

The present invention provides a liquid level gage and an illuminator therefor. One embodiment of the liquid level gage includes a housing, a liquid column, an illuminator, and a power supply. The housing has a first or front end and a second or rear end. The liquid column includes a plurality of liquid column bodies connected to the front end of the housing. The liquid column also includes a first or front port assembly and a second or rear port assembly connected to each liquid column body. The liquid column is connected, either directly or indirectly, to a vessel. The illuminator includes a plurality of directed light source assemblies connected to the rear end of the housing. Half of the directed light source assemblies emit a first color light and half of the directed light source assemblies emit a second color light. A pair of bi-color directed light source assemblies (i.e., one directed light source assembly emitting the first color light and one directed light source assembly emitting the second color light) correspond to each liquid column body and pair of port assemblies (i.e., the front port assembly and the rear port assembly connected to the liquid column body). Each pair of bi-color directed light source assemblies is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

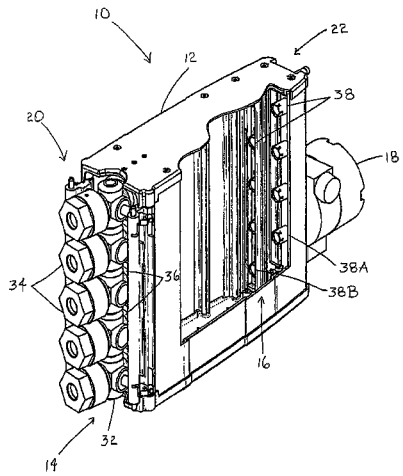

U.S. PATENT DOCUMENTS

| | | |
|---|---|---|
| 5,645,336 A | 7/1997 | Brown et al. |
| 5,647,656 A | 7/1997 | Brown et al. |
| 5,660,461 A | 8/1997 | Ignatius et al. |
| 5,743,137 A | 4/1998 | Brown et al. |
| 5,886,559 A | 3/1999 | Berrill |
| 6,028,521 A | 2/2000 | Issachar |
| 6,033,087 A | 3/2000 | Shozo et al. |
| 6,067,855 A | 5/2000 | Brown et al. |
| 6,223,595 B1 | 5/2001 | Dumbovic et al. |
| 6,502,461 B2 | 1/2003 | Keller |
| 6,588,272 B2 | 7/2003 | Mulrooney et al. |
| 2001/0032506 A1 | 10/2001 | Keller |
| 2004/0076003 A1 | 4/2004 | Collura et al. |
| 2005/0056092 A1 | 3/2005 | Kowalski |

US 7,047,806 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 7, 13 and 17 are cancelled.

Claims 1, 3, 8-12, 14-16 and 18-21 are determined to be patentable as amended.

Claims 4-6, dependent of an amended claim, are determined to be patentable.

New claims 22-25 are added and determined to be patentable.

1. A liquid level gage, comprising:
   a housing having a first end and a second end;
   a liquid column connected to the first end of the housing, the liquid column including a plurality of liquid column bodies and a plurality of port assemblies, wherein a pair of port assemblies is connected to each liquid column body; and
   an illuminator connected to the second end of the housing, the illuminator including a plurality of directed light source assemblies, wherein:
      half of the directed light source assemblies *include green light emitting diodes that* emit [a first color] *green* light and half of the directed light [sources] *source assemblies include red light emitting diodes that* emit [a second color] *red* light,
      a pair of [bi-color] *green and red* directed light source assemblies corresponds to each liquid column body and pair of port assemblies, and
      each pair of [bi-color] *green and red* directed light source assemblies is oriented with respect to the corresponding liquid column body and pair of port assemblies in such a way that [the first color] *green* light passes through the corresponding liquid column body and pair of port assemblies when a liquid is present in the corresponding liquid column body and [the second color] *red* light passes through the corresponding liquid column body and pair of port assemblies when a non-liquid is present in the corresponding liquid column body.

3. The liquid level gage of claim [2] *1*, wherein:
   an angle between a line passing through a center of the green directed light source assembly to a line passing through a center of the corresponding liquid column body is in the range of 0-25 degrees; and
   an angle between a line passing through a center of the red directed light source assembly to the line passing through the center of the corresponding liquid column body is in the range of 0-25 degrees.

8. The liquid level gage of claim [2] *1*, wherein each green directed light source assembly includes a reflecting cup and each red directed light source assembly includes a reflecting cup.

9. The liquid level gage of claim [2] *1*, wherein each green directed light source assembly includes a focusing lens and each red directed light source assembly includes a focusing lens.

10. The liquid level gage of claim [2] *1*, wherein the liquid is water.

11. A liquid level gage, comprising:
   a housing having a front end and a rear end;
   a liquid column connected to the front end of the housing, the liquid column including a plurality of liquid column bodies and a plurality of port assemblies, wherein:
      a pair of port assemblies is connected to each liquid column body, and
      an angle between a line passing through a center of each port assembly and a line passing through a center of the corresponding liquid column body is approximately 10 degrees; and
   an illuminator connected to the rear end of the housing, the illuminator including a plurality of green light emitting diode assemblies and a plurality of red light emitting diode assemblies, wherein:
      a green light emitting diode assembly and a red light emitting diode assembly correspond to each liquid column body and pair of port assemblies,
      an angle between a line passing through a center of the green [directed] light [source] *emitting diode* assembly to the line passing through the center of the corresponding liquid column body is approximately 7.1 degrees, and
      an angle between a line passing through a center of the red [directed] light [source] *emitting diode* assembly to the line passing through the center of the corresponding liquid column body is approximately 3.6 degrees,
      whereby the green light passes through the corresponding liquid column body and pair of port assemblies when a liquid is present in the corresponding liquid column body and the red light passes through the corresponding liquid column body and pair of port assemblies when a non-liquid is present in the corresponding liquid column body.

12. An illuminator for a liquid level gage, the liquid level gage including a housing having a first end and a second end and a liquid column connected to the first end of the housing, the liquid column including a plurality of liquid column bodies and a plurality of port assemblies, wherein a pair of port assemblies is connected to each liquid column body, the illuminator comprising:
   a plurality of directed light source assemblies connected to the second end of the housing, wherein:
      half of the directed light source assemblies *include green light emitting diodes that* emit [a first color] *green* light and half of the directed light [sources] *source assemblies include red light emtting diodes that* emit [a second color] *red* light,
      a pair of [bi-color] *green and red* directed light source assemblies corresponds to each liquid column body and pair of port assemblies, and
      each pair of [bi-color] *green and red* directed light source assemblies in oriented with respect to the corresponding liquid column body and pair of port assemblies in such a way that [the first color] *green* light passes through the corresponding liquid column body and pair of port assemblies when a liquid is present in the corresponding liquid column body and [the second color] *red* light passes through the corresponding liquid column body and pair of port assemblies when a non-liquid is present in the corresponding liquid column body.

14. The *illuminator for the* liquid level gage of claim [12] 13; wherein:
    an angle between a line passing through a center of the green directed light source assembly to a line passing through a center of the corresponding liquid column body is in the range of 0-25 degrees; and
    an angle between a line passing through a center of the red directed light source assembly to the line passing through the center of the corresponding liquid column body is in the range of 0-25 degrees.

15. The *illuminator for the* liquid level gage of claim 14; wherein:
    the angle between the line passing through the center of the green directed light source assembly to the line passing through the center of the corresponding liquid column body is in the range of 0-10 degrees; and
    the angle between the line passing through the center of the red directed light source assembly to the line passing through the center of the corresponding liquid column body is in the range of 0-10 degrees.

16. The *illuminator for the* liquid level gage of claim 15; wherein:
    the angle between the line passing through the center of the green directed light source assembly to the line passing through the center of the corresponding liquid column body is approximately 7.1 degrees; and
    the angle between the line passing through the center of the red directed light source assembly to the line passing through the center of the corresponding liquid column body is approximately 3.6 degrees.

18. The *illuminator for the* liquid level gage of claim [13] 12, wherein each green directed light source assembly includes a reflecting cup and each red directed light source assembly includes a reflecting cup.

19. The *illuminator for the* liquid level gage of claim [13] 12, wherein each green directed light source assembly includes a focusing lens and each red directed light source assembly includes a focusing lens.

20. The *illuminator for the* liquid level gage of claim [13] 12, wherein the liquid is water.

21. An illuminator for a liquid level gage, the liquid level gage including a housing having a front end and a rear end and a liquid column connected to the front end of the housing, the liquid column including a plurality of liquid column bodies and a plurality of port assemblies, wherein a pair of port assemblies is connected to each liquid column body and an angle between a line passing through a center of each port assembly and a line passing through a center of the corresponding liquid column body is approximately 10 degrees, the illuminator comprising:
    a plurality of green light emitting diode assemblies and a plurality of red light emitting diode assemblies connected to the rear end of the housing, wherein:
        a green light emitting diode assembly and a red light emitting diode assembly correspond to each liquid column body and pair of port assemblies,
        an angle between a line passing through a center of the green [directed] light [source] *emitting diode* assembly to the line passing through the center of the corresponding liquid column body is approximately 7.1 degrees, and
        an angle between a line passing through a center of the red [directed] light [source] *emitting diode* assembly to the line passing through the center of the corresponding liquid column body is approximately 3.6 degrees,
        whereby the green light passes through the corresponding liquid column body and pair of port assemblies when a liquid is present in the corresponding liquid column body and the red light passes through the corresponding liquid column body and pair of port assemblies when a non-liquid is present in the corresponding liquid column body.

22. A liquid level gage, comprising:
    a housing having a first end and a second end;
    a liquid column connected to the first end of the housing, the liquid column including a plurality of liquid column bodies and a plurality of port assemblies, wherein a pair of port assemblies is connected to each liquid column body; and
    an illuminator connected to the second end of the housing, the illuminator including a plurality of integral intrinsically focused and colored light sources, wherein:
        half of the light sources emit a first color light and half of the light sources emit a second color light,
        a pair of the light sources corresponds to each liquid column body and pair of port assemblies, each pair of the light sources includes one light source that emits the first color light and one light source that emits the second color light, and
        each pair of the light sources is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

23. The liquid level gage of claim 22, wherein each light source includes a light emitting diode.

24. An illuminator for a liquid level gage, the liquid level gage including a housing having a first end and a second end and a liquid column connected to the first end of the housing, the liquid column including a plurality of liquid column bodies and a plurality of port assemblies, wherein a pair of port assemblies is connected to each liquid column body, the illuminator comprising:
    a plurality of integral intrinsically focused and colored light sources connected to the second end of the housing, wherein:
        half of the light sources emit a first color light and half of the light sources emit a second color light,
        a pair of the light sources corresponds to each liquid column body and pair of port assemblies, each pair of the light sources includes one light source that emits the first color light and one light source that emits the second color light, and
        each pair of the light sources is oriented with respect to the corresponding liquid column body and pair of port assemblies in such a way that the first color light passes through the corresponding liquid column body and pair of port assemblies when a liquid is present in the corresponding liquid column body and the second color light passes through the corresponding liquid column body and pair of port assemblies when a non-liquid is present in the corresponding liquid column body.

25. The illuminator for the liquid level gage of claim 24, wherein each light source includes a light emitting diode.

* * * * *